US012260454B2

(12) United States Patent
Melton (10) Patent No.: US 12,260,454 B2
(45) Date of Patent: Mar. 25, 2025

(54) PIPELINED CREDIT CHECKING

(71) Applicant: REFINITIV US ORGANIZATION LLC, New York, NY (US)

(72) Inventor: Hayden Melton, Philadelphia, PA (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 186 days.

(21) Appl. No.: 17/886,676

(22) Filed: Aug. 12, 2022

(65) Prior Publication Data

US 2023/0051532 A1    Feb. 16, 2023

Related U.S. Application Data

(60) Provisional application No. 63/237,651, filed on Aug. 27, 2021, provisional application No. 63/233,038, filed on Aug. 13, 2021.

(51) Int. Cl.
*G06Q 40/03* (2023.01)
*G06Q 40/04* (2012.01)
*H04L 67/568* (2022.01)

(52) U.S. Cl.
CPC .......... *G06Q 40/03* (2023.01); *G06Q 40/04* (2013.01); *H04L 67/568* (2022.05)

(58) Field of Classification Search
CPC .............................. G06Q 40/03; H04L 67/568
See application file for complete search history.

(56) References Cited

U.S. PATENT DOCUMENTS

2011/0264577 A1   10/2011  Winbom et al.
2013/0346274 A1   12/2013  Ferdinand et al.
2015/0127516 A1    5/2015  Studnitzer et al.
2018/0067864 A1*   3/2018  Park .................... G01R 22/063
2023/0319159 A1*  10/2023  Rebert .................. H04L 67/568
                                                          358/1.15

OTHER PUBLICATIONS

International Search Report and Written Opinion dated Nov. 7, 2022, issued in the corresponding International Application No. PCT/IB2022/057544, pp. 1-14.

* cited by examiner

*Primary Examiner* — Bennett M Sigmond
*Assistant Examiner* — Marla Hudson
(74) *Attorney, Agent, or Firm* — Pillsbury Winthrop Shaw Pittman LLP (57) ABSTRACT

The disclosure relates to non-blocking messaging in an electronic trading venue (ETV) in which a matching engine sends groups of price-compatible contra-orders to a credit engine. Doing so may improve the ETV's efficacy and performance by eliminating the need for multiple roundtrips of messages in the case of a failed credit check, and/or by allowing the ETV to more faithfully implement its matching rules. Upon sending an order to the credit engine the matching engine marks it as 'uncertain' to indicate that additional requests received on it (e.g., cancels) must also be forwarded to the credit engine. When all pending requests on an order have been acknowledged by the credit engine the matching engine unmarks it as such. In addition to credit checking the credit engine may also perform computations related to advanced order types (e.g., icebergs) indicating the output of such in its acknowledgements to the matching engine.

2 Claims, 8 Drawing Sheets

PIPELINED CREDIT CHECKING

RELATED APPLICATIONS

This application claims priority to U.S. Provisional Patent Application No. 63/233,038, filed Aug. 13, 2021, entitled "Pipelined Credit Checking," and U.S. Provisional Patent Application No. 63/237,651, filed Aug. 27, 2021, entitled "Deterministic Credit System," the contents of each of which are incorporated by reference in their entireties herein.

BACKGROUND

When communicating data between devices in an electronic communication network, oftentimes it is necessary for a message transmitter to wait for a response from a message receiver before another message is sent. For example, the message transmitter may transmit a message that represents a request to a message receiver. In this example, the message transmitter may have to wait for a response from the message receiver. Such wait may be necessary because the response may completely resolve the original request such that no new messaging is required. In another example, the response may only partially resolve the original request and require another message to request resolution of the remaining portions of the original request. In yet another example, the response may not resolve any portion of the original request, requiring another message that requests completion of the original request. Such messaging may be referred to herein as blocking because subsequent messages are blocked from generation and/or transmission pending the receipt of responses to prior messages.

Blocking messaging may cause latency issues, particularly when a number of cycles of message transmission, response receipt, and new message generation is necessary. Furthermore, blocking messaging may impose higher loads on computer infrastructure because of the serial nature of computing and transmitting messages, responses, and new messages (and responses to those new messages). These and other issues may exist in systems that use blocking messaging.

SUMMARY

The disclosure relates to systems, methods, and computer-readable media for non-blocking messaging in an electronic communication network. The term non-blocking may refer to the generation and/or transmission of a message through an electronic communication network without having to wait for a response from a message receiver.

In non-blocking messaging, a message transmitter may generate messages and transmit the messages to a message receiver without waiting for responses from the message receiver. The message receiver may incorporate some or all of the logic from the message transmitter to at least partially process the messages in the same way as the message transmitter, to at least partly facilitating non-blocking messaging. To further facilitate non-blocking messaging, the message receiver may generate and update a cache for the messages. The cache may maintain a state of the content of the messages so that the message receiver may continue to receive messages from the message transmitter in a non-blocking manner. In some examples, the cache may be a hash that maps parties associated with the messages to maintain a state of the data relating to the parties. Thus, the cache may be a hashmap cache that maintains a state of the data from the messages. In some examples, the parties may each be identified by respective identifiers, in which case the hashmap cache may be keyed based on a pair of the identifiers. The hashmap cache may facilitate rapid indexing of the data in the messages and maintenance of the state of the data, which may in turn facilitate non-blocking messaging disclosed herein.

Because the non-blocking messaging may result in a stream of messages, some of the messages may relate to one another while other ones of the messages do not. Thus, the message receiver may perform a lookup of related messages in the cache (such as via the index) and evaluate related ones of the messages based on the logic of the message transmitter, logic of the message receiver, and the cache.

Non-blocking messaging may be implemented in various contexts in which a message transmitter must otherwise wait for a response from a message receiver. In the context of an electronic trading venue, an example of a message transmitter is a matching engine and an example of a message receiver is a credit engine. In an ordinary blocking scheme, the matching engine receives orders from market participants and identifies price-compatible orders that are contra to one another (such as a taker order and a contra-order that are price-compatible to one another). The matching engine may then ordinarily transmit the order and the contra-order to a credit engine to ensure that the parties that submitted the order and the contra-order have sufficient bilateral credit with one another.

The credit engine may determine whether the parties have extended appropriate bilateral credit to complete the order and contra-order and transmit a response back to the matching engine. If there is sufficient bilateral credit, the order is completed. If there is no bilateral credit, then the matching engine will identify a new potential match and submit that potential match to the credit engine. Thus, order matching by the matching engine and the requisite bilateral credit checking by the credit engine will ordinarily require blocking messaging, which causes latency and computational load in matching and completing orders.

In non-blocking messaging, the matching engine may identify price compatible orders and contra-orders. Rather than wait for credit checking, the matching engine may forward the messages containing orders from market participants to the credit engine in a non-blocking manner. That is, messages conveying the orders and contra-orders may be transmitted to the credit engine in real-time without waiting for credit checking responses. The credit engine may receive the messages and store them in a cache, which may be a hashmap cache. The hashmap cache may be used to update a state of the cached orders. The credit engine may look up orders in the cache and use match rules ordinarily used by the matching engine to match the cached orders as well as perform credit checking on the orders. The credit engine may generate a result of such lookup, matching and credit checking to the matching engine, which may update its limit order books. Through these and other improvements, the ETV may implement non-blocking messaging, which may reduce latency and enhance throughput for processing orders.

BRIEF DESCRIPTION OF THE DRAWINGS

Features of the present disclosure may be illustrated by way of example and not limited in the following Figure(s), in which like numerals indicate like elements, in which.

DETAILED DESCRIPTION

Systems and methods are disclosed to provide non-blocking messaging in an electronic communication network. A message may refer to data that is communicated over an electronic communication network. Blocked messaging is used in various contexts whenever the generation or transmission of a subsequent message is based on a response from a receiver to a prior message. However, because of the nature of blocked messaging, computer systems and networks may suffer from latency from the waiting and throughput problems because of the repeated message-and-response that may occur.

Figure 1A:
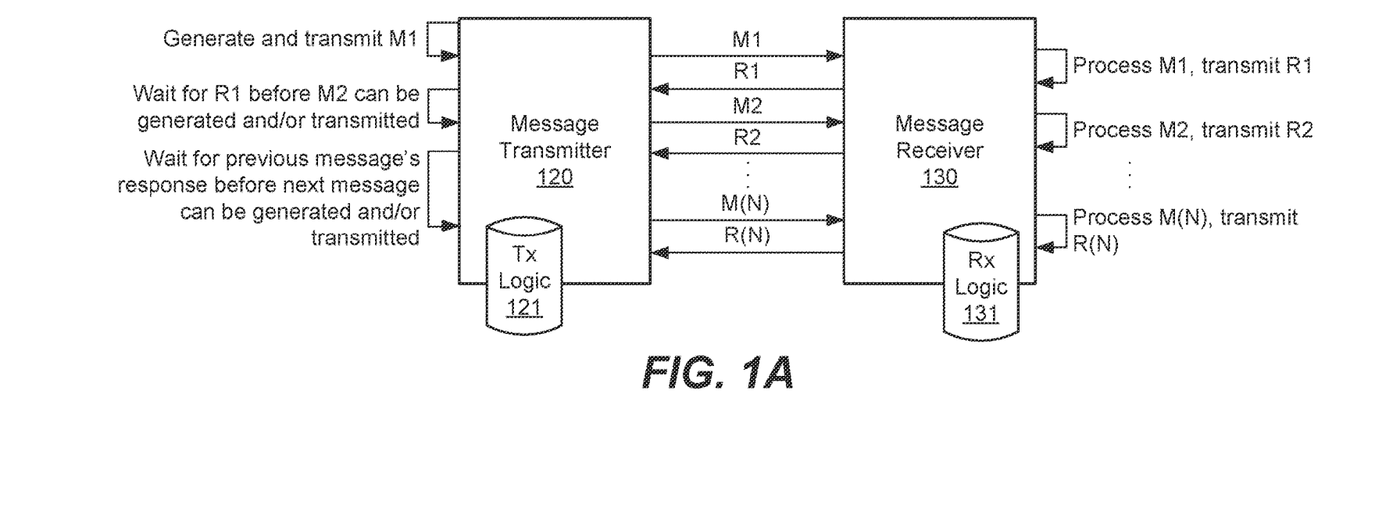
FIG. 1A illustrates a schematic example of blocking messaging in which generation and/or transmission of a message is blocked until a response to a prior message has been received.

For example, FIG. 1A illustrates a schematic example of blocked messaging in which generation and/or transmission of a message is blocked until a response to a prior message has been received. Blocked messaging may arise when a message transmitter 120 uses transmitter logic (Tx logic) 121 in the generation of messages (M1-M(N)) and relies on a message receiver 130 that uses receiver logic (Rx logic) 131 to provide a result of processing the messages.

For example, the message transmitter 120 may use Tx logic 121 to generate a message M1 and transmit the message M1 to the message receiver 130. The message receiver 130 may apply Rx logic 131 to process the message M1 and generate a result of processing the message M1. The message receiver 130 may then transmit back a response R1 that indicates the result. In some examples, the response R1 may complete the exchange of data required between the message transmitter 120 and the message receiver 130, in which case no further messaging relating to M1 is required between the message transmitter 120 and the message receiver 130. In other instances, the response R1 does not complete the exchange of data required, in which case the message transmitter 120 may apply Tx logic 121 to generate a new message M2 for transmission to the message receiver 130. Thus, whether or not the message M2 needs to be generated may be based on the response R1. Furthermore, in some instances, the generation of message M2 is based on the content of the response R1. For example, not only is the necessity of the message M2 contingent upon the content of response R1, the content of message M2 may be based on the content of response R1. Because the necessity and/or content of the message M2 is based on the content of response R1, the message M2 is referred to as being blocked. The foregoing blocked messaging may continue until the data exchange relating to the message M1 is complete.

As can be seen in the above, blocked messaging may lead to network latency because the message transmitter 120 has to wait for the response from the message receiver 130 before determining whether the exchange of data is complete or whether further exchanges are necessary. If further exchanges are necessary, such further exchange is subject to more waiting, further exacerbating latency and computational load in computing Tx logic 121 and Rx logic 131. Other issues may arise out of blocked messaging as well.

Figure 1B:
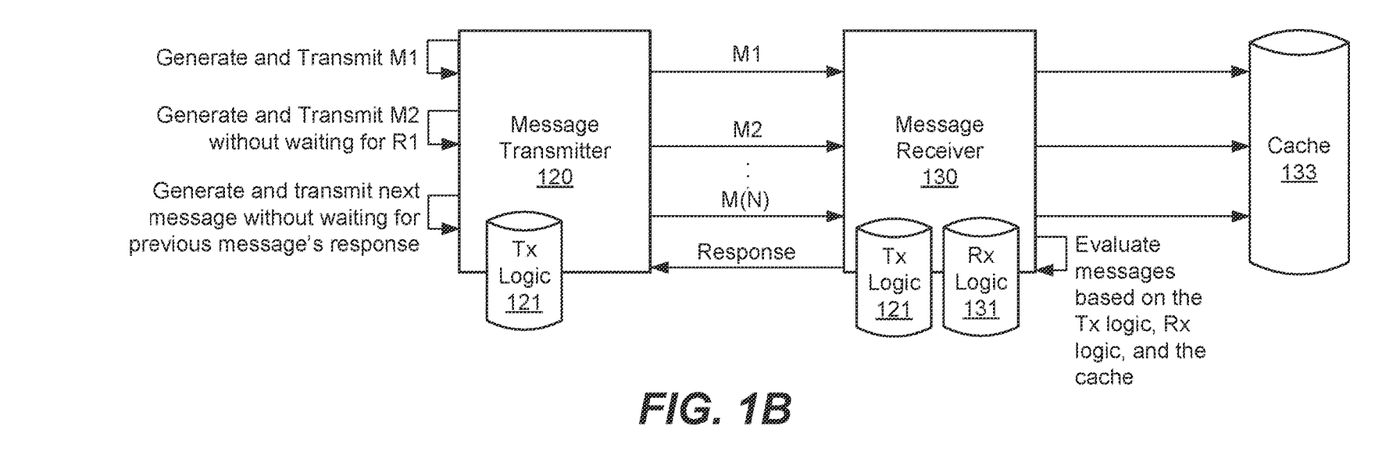
FIG. 1B illustrates a schematic example of non-blocking messaging in which generation and/or transmission of a message is not blocked, reducing bandwidth usage and improving speed.

To address the foregoing and other issues, non-blocking messaging may improve the performance of systems such as the message transmitter 120 and/or the message receiver 130, as well as the electronic communication network. For example, FIG. 1B illustrates a schematic example of non-blocking messaging in which generation and/or transmission of a message is not blocked, reducing bandwidth usage and improving speed, among other improvements.

In non-blocking messaging, the message transmitter 120 may apply Tx logic 121 to generate messages M1-M(N) and transmit the messages without waiting for responses from the message receiver 130. The message receiver 130 may incorporate some or all of the Tx logic 121 to at least partially process the messages M1-M(N) in the same way as the message transmitter 120, enabling the message transmitter 120 to offload at least some of its functionality on the message receiver 130 to at least partly facilitate non-blocking messaging. The message receiver 130 may generate and update a cache 133 for the messages M1-M(N). The cache 133 may maintain a state of the content of the messages M1-M(N). In some examples, the cache 133 may be a hash that maps parties associated with the messages M1-M(N) to maintain a state of the data relating to the parties. Thus, the cache 133 may be a hashmap cache that maintains a state of the data from the messages M1-M(N). In some examples, the parties may each be identified by respective identifiers, in which case the hashmap cache may be keyed based on a pair of the identifiers. The hashmap cache may facilitate rapid indexing of the data in the messages M1-M(N) and maintenance of the state of the data, which may in turn facilitate non-blocking messaging disclosed herein.

Because the non-blocking messaging may result in a stream of messages M1-M(N), some of the messages M1-M(N) may relate to one another while other ones of the messages M1-M(N) do not. Thus, the message receiver 130 may perform a lookup of related messages M1-M(N) in the cache 133 (such as via the index) and evaluate related ones of the messages M1-M(N) based on the Tx logic 121, Rx logic 131, and the cache 133. Referring to both FIGS. 1A and 1B, it should be noted that the transmitter 120 may also receive data (such as responses R1-R(N)). Similarly, the receiver 130 may also transmit data (such as responses R1-R(N)).

Having described an overview of blocking and non-blocking messaging, attention will now turn to an example of a system that is improved by applying non-blocking messaging for further illustration. For example, FIG. 2 illustrates an example of a system 200 of an electronic trading venue ("ETV") 210 that implements non-blocking messaging in an electronic communication network.

Financial instruments that are traded on electronic trading venues (ETVs) may be centrally or bilaterally cleared. In the case of bilateral clearing a credit relationship must exist between the two counterparties for a trade to occur between them. On ETVs implementing pre-trade anonymity among participants it is the ETV that must decide when price-compatible contra-orders for an instrument are eligible to form a trade. The component of the ETV that is typically responsible for doing this is often referred to as the credit engine. On conventional ETVs hosting instruments that trade on the basis of bilateral credit trades are initially formed inside the matching engine component using attributes of orders such as price, side and time, and those partially formed trades are subsequently sent with counterparty information to the credit engine for credit checking. If credit checking succeeds the trade is completed; if not it has failed and the trade is unwound. This conventional approach to trade formation is shown diagrammatically in FIG. 1.

Figure 2:
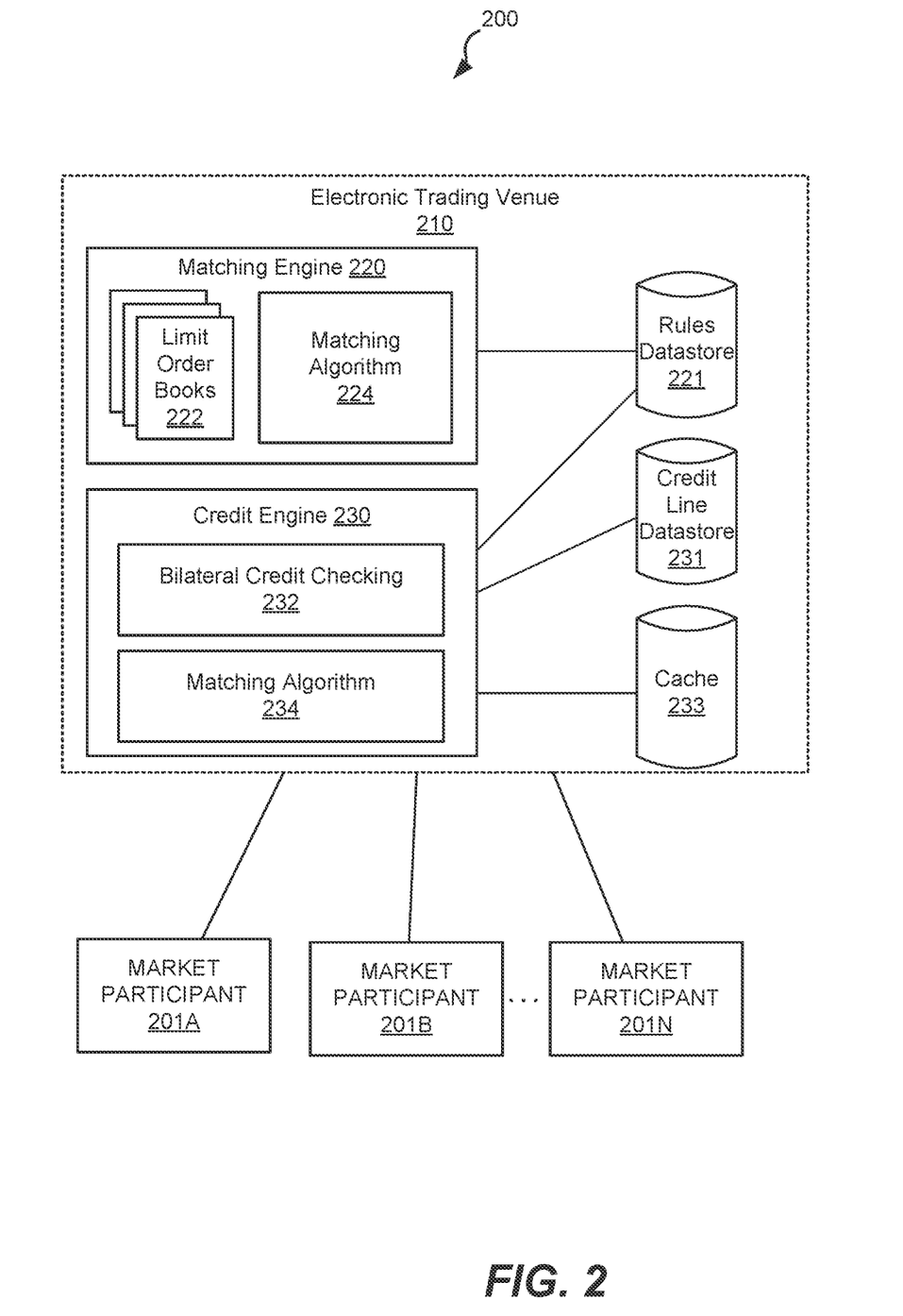
FIG. 2 illustrates an example of a computer system of an electronic trading venue that implements non-blocking messaging in an electronic communication network.

What may further characterize conventional trade formation in bilaterally cleared ETVs is the division of responsibility among the components shown in FIG. 2. Ordinarily, the matching engine may be responsible for performing operations on orders (managing their states in terms of their open/filled quantities, replenishing their visible quantities from their reserve quantities if advanced order types such as icebergs are supported, rejecting or accepting cancel/cancel-replace requests, and so forth), whereas the credit engine may be responsible for performing operations on partially formed trades.

Such a division of responsibility may be advantageous for an ETV implemented as a software product line (e.g., where both central clearing and bilateral trading are supported), and for software engineering activities such as testing, maintenance, division of labor, and so on.

Conventional approaches to credit checking on ETVs with bilateral credit, however, suffer a number of drawbacks. One such drawback manifests when the credit check fails between the counterparties and the (partially formed) trade needs to be unwound. In this scenario if the matching engine strictly respects price-time priority for passive orders the credit-checking operation may need to block so other passive orders with lower time or price priority on the instrument cannot trade while a trade involving a passive order having higher priority is in-flight between the matching engine and credit engine components, or is being processed by the credit engine component. Such blocking operations are detrimental to the throughput/performance of the matching engine and in turn to that of the ETV overall.

If, on the other hand, the matching engine does not strictly respect price-time priority (e.g., by performing a non-blocking credit check) then additional drawbacks may manifest upon failure of a credit check. Chief among these may be having to explain to a market participant why trades occurred on lower priority passive orders while theirs was in-flight as a partially formed trade but ultimately failed.

Further drawbacks may present themselves as technical complications if in a conventional ETV the credit-check is non-blocking. These include whether to remove the order from the book and publish it in market data at the time of the partially formed trade, or to delay its removal and publish market data only after a response is received by the matching engine from the credit engine; whether or not to reposition or cancel an order that has failed a credit check; whether or not to perform further round-trips between the matching engine and credit engine to 'bust' subsequent trades and retry on the initial failed trade with subsequent taker orders in an attempt to restore price-time priority, and so on. Besides the additional software engineering effort required to address these technical complications—both for the ETV operator, and to the extent any such complication becomes externally observable for market participants too—many may also be detrimental to the ETV's throughput, response time and performance, generally.

The ETV 210 may include a matching engine 220, which is an example of the message transmitter 120 illustrated in FIGS. 1A and 1B, and a credit engine 230, which is an example of the message receiver 130 illustrated in FIGS. 1A and 1B. In this example, the exchange logic in the rules datastore 221 is an example of Tx logic 121 used by the transmitter 120 in FIGS. 1A and 1B to generate messages. The credit line datastore 231 may store credit line relationships among participants 101. The credit line datastore 231 and logic of the bilateral credit checking 232 at the credit engine 230 is an example of the Rx logic 131 used by the message receiver 130 in FIGS. 1A and 1B.

The ETV 210 may receive orders from market participants 201A-N. For example, each market participant 101 may send orders to the ETV 210, receive messages responsive to those orders, receive market data updates from the ETV 210, and/or otherwise interact with the ETV 210. The infrastructure between the market participants 201 and matching engine 220 of the ETV 210 (such as object gateways and market data distributors are well-known and therefore omitted from FIG. 2 for clarity). The term "market participant" (or simply "participant") is intended to be broadly construed to refer to any entity that receives (through a computing device) market data from the venue, or sends (through a computing device) object-related messages to the venue, including, but not limited to: a firm that conducts business on the electronic trading venue, a credit entity associated with such a firm (a single firm may have a plurality of credit entities), or a user (human or otherwise).

Orders from market participants 201 may be processed by the matching engine 220, which may host limit object books 222 for various instruments for which the orders relate. Each order may correspond to an order to be matched at the ETV 210 with other orders. The matching engine 220 may use default exchange logic, which may be encoded in the rules datastore 221 to match a given order with other orders in the limit object books 222. For example, an order may be a taker order that takes a contra-order such as a maker object in a limit object book 222. Other types of orders may be matched against a limit order book 222.

In particular, the matching engine 220 may use the matching algorithm 224 to determine whether two contra objects are eligible to match with one another by ensuring the orders are price-compatible and on contra-sides. When the matching engine 220 pairs orders based on price-compatibility and being on contra-sides, the ETV 210 still needs to validate the pair by ensuring that participants 201 that submitted the orders have sufficient bilateral credit between them to complete the paired orders. If no bilateral credit exists at all between the participants 201, then the entire pair must be abandoned and the matching engine 220 may seek a new pair to fulfill the orders. If some, but insufficient, bilateral credit exists between the participants 201, then only part of the paired orders will be matched up to the bilateral credit that exists between the participants, and the matching engine 220 may seek addition pairs of orders that are price compatible and contra-sides to one another to fill the remaining portion of the order.

To perform bilateral credit checking, the matching engine 220 may consult a credit engine 230. Ordinarily, such bilateral credit checking is necessarily performed in a blocked messaging manner to satisfy price-time or other rules. An example of blocked messaging (illustrated in FIG. 1A) used by the ETV 210 will be described to illustrate the latency, throughput, and other issues that such blocked messaging causes in the context of orders processed by an electronic trading venue and transmitted through an electronic communication network. This example will be followed by an examples in which non-blocking messaging (illustrated in FIG. 1B) is implemented by the ETV 210, including a discussion with respect to FIGS. 3-7.

Blocked Messaging of the ETV 210

The matching engine 220 may generate a message to the credit engine 230 that requests whether the participants 201 that submitted price-compatible and contra-orders (such as a taker and maker orders) have sufficient bilateral credit to complete the match. If so, the ETV 210 may update the credit line datastore 231 to 'drawdown' the credit lines between the two participants' lines in the amount of the match. If not, the matching engine 220 may find other price compatible contra-orders to partially or completely fill an order. Because the ETV 210 must comply with price-time rules to ensure fairness, and because the credit engine 230 has access to the bilateral credit lines between participants 201, the matching engine 220 ordinarily must submit a first pair of orders to the credit engine 230 and wait for a response from the credit engine 230 to determine whether there is sufficient bilateral credit between the participants 201 before the next-in-line price compatible contra order should be matched with an order to complete the order.

Non-Blocking Messaging of the ETV 210

The ETV 210 may be improved to implement a non-blocking approach to credit checking that imposes some responsibility for state management of orders and implementation of matching rules (which are examples of Tx logic 121 in FIGS. 1A and 1B) from the rules datastore 221 onto the credit engine 230. Such non-blocking messaging used in the ETV 210 may be referred to herein as "pipelined credit checking." In examples of non-blocking messaging, the matching engine 220 may send groups of price-compatible contra-orders to the credit engine 230. Upon receiving those orders the credit engine 230 may determine which can match, based on credit and the matching rules. Since the credit engine 230 will typically receive from the matching engine 220 all contra-orders that could match (such as all passive orders that are price-compatible with the taker) along with the corresponding taker order, the credit engine 230 may perform a matching function across multiple orders substantially all-at-once. This can ensure that price-time rules (and/or other rules the ETV 210 may implement for matching such as for visible and hidden portions of an iceberg, and its replenishment) are never violated, even when a credit check fails. Advantageously under pipelined credit checking this can happen (i) without blocking at the matching engine 220, and (ii) without multiple roundtrips of messaging between the matching engine and credit engine in the case of a credit failure. The credit engine 230 then sends completed trades and orders with updated attributes back to the matching engine 220.

The non-blocking nature of pipelined credit checking may require state management of orders within the credit engine 230. The same passive orders may be sent in duplicate (or triplicate or more, across multiple requests) to the credit engine 230 if two or more competing taker orders are received by the matching engine in quick succession. To avoid 'overfills' on such orders the credit engine 230 may maintain state for orders it has received in the cache 233. The cache 233 may store the state of orders, such as whether and the extent to which filled. The cache 233 may be implemented as a hashmap cache containing the most recent versions of such orders.

To illustrate, assuming two taker orders received in quick succession are both price compatible only with the same (single) passive order, if the first taker order completely fills the open quantity of the passive order then irrespective of credit no quantity remains for the second taker order to match with. If the taker orders are received in very close temporal proximity then only the credit engine 230, and not the matching engine 220, knows with certainty that the maker order was filled. Thus, the credit engine 230 must do some state management on the orders it receives.

In some examples of pipelined credit checking, the matching engine 220 may operate in an unmodified manner with respect to orders it is "certain" about. The matching engine 220 is "uncertain" about an order if and only if that order is the subject of a pending request to the credit engine 230. For example, the matching engine 220 may store an indication that the taker order and each of a plurality of contra-orders are uncertain, which indicates that it is uncertain whether the taker order and any one of the plurality of contra-orders is pending review by the credit checking engine. Any subsequent related orders are forwarded to the credit checking engine 230 based on the indication that the taker order and each of the plurality of contra-orders are indicated as uncertain. Specifically, by virtue of the request being pending, the matching engine 220 does not know if the order will be completely filled, partially filled, canceled or will remain unchanged. Put another way, if there are no pending requests on an order (i.e., requests to the credit engine for which the matching engine has not received a corresponding response) then the matching engine 220 can be certain about the state of that order and can process it itself independently of the credit engine 230—a cancel request, cancel-replace request or amendment of that order can thus be processed by the matching engine 220 in an unmodified manner.

In some examples of pipelined credit checking, the matching engine 220 may forward cancel requests, cancel-amendments and/or amendments on uncertain orders to the credit engine. This may ensure those requests do not themselves cause blocking in the matching engine 220 and may allow additional flexibility in how those requests are processed. For instance, if the ETV 210 is under heavy load and there is queuing of requests at the credit engine 230, the operator of the ETV 210 may decide that cancel requests should jump to the front of that queue inside the credit engine 230 and thereby be given priority over taker orders. For example, an uncertain order is pending review by the credit checking engine 230. Any subsequent related orders (such as being related to the same instrument) are forwarded to the credit checking engine 230 based on the indication that the taker order and each of the plurality of contra-orders are indicated as uncertain. On the other hand, an order indicated as certain is matched by the matching engine 220 without transmission of the entire order details to the credit checking engine 230.

Figure 3:
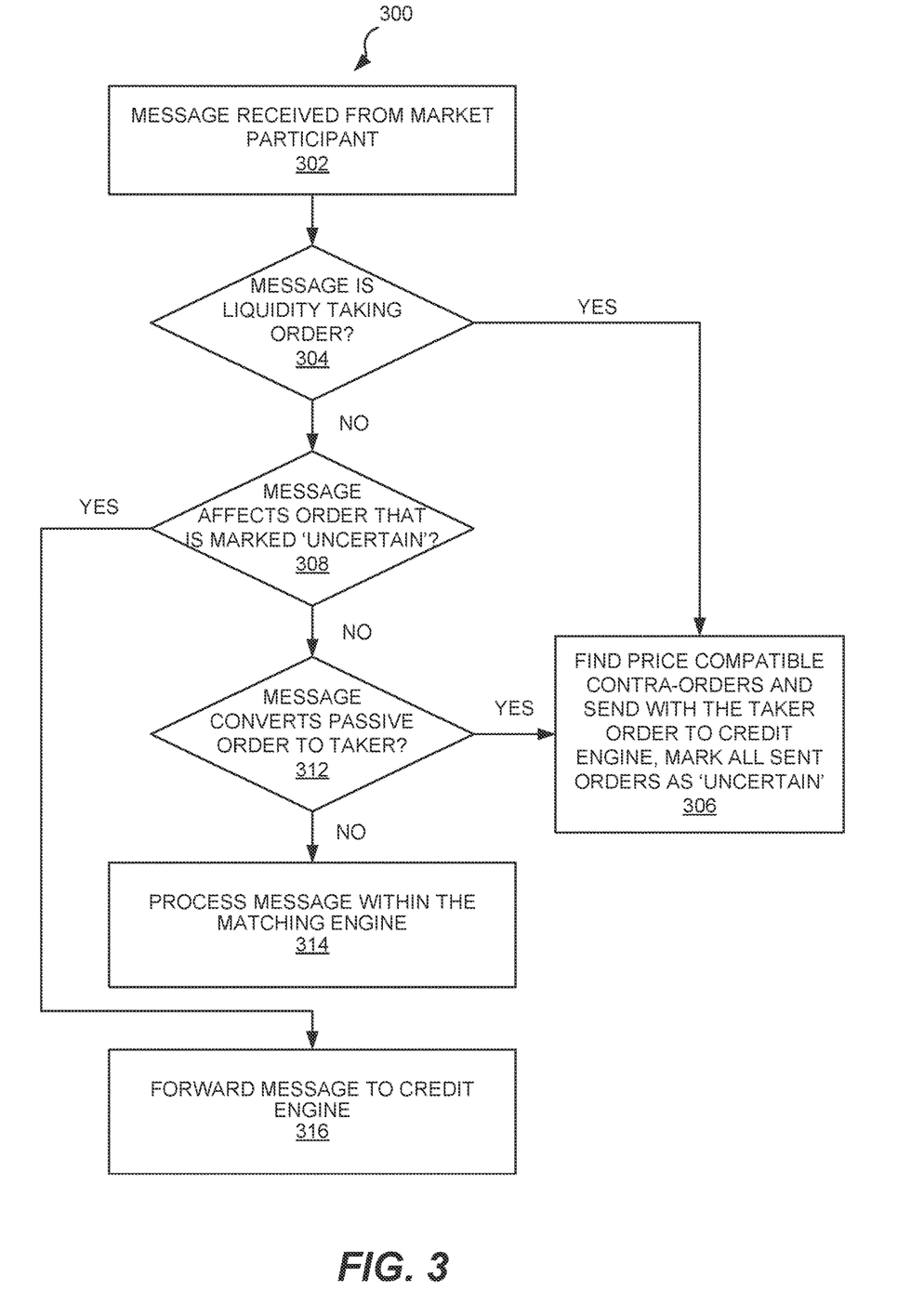
FIG. 3 illustrates an example of a method of matching by a matching engine of the ETV in conjunction with the credit engine.

To illustrate pipelined credit checking further, reference will be made to FIGS. 3-7. FIG. 3 illustrates an example of a method 300 of matching by a matching engine 220 of the ETV 210 in conjunction with the credit engine 220. At 302, the method 300 may include receiving a message from a market participant 201. At 304, the method 300 may include determining whether the message encodes a taker order, which is an order that is taking liquidity (usually this means it is a buy order with a limit price greater than or equal to the prevailing offer for the instrument on the ETV 210, or a sell order with limit price less than or equal to its prevailing bid).

If the encodes a taker order, then at 306, the method 300 may include finding price compatible contra-orders and sending the taker order and price compatible contra-orders to the credit engine 230 and marking all sent orders as 'uncertain.'

If the message is not a taker order, then at 308, the method 300 may include determining whether the message that affects an order that is marked "uncertain."

If the message affects an order marked as uncertain, then at 316, the method 300 may include forwarding that message to the credit engine 230. In this example, the message may be a cancel or cancel-replace request, although other types of orders may be encoded by that message. The credit engine 220 will then process that message according to the ETV's matching rules.

Returning to 308, if the message does not affect an order marked as uncertain, then at 312, the method 300 may include determining whether the message converts a passive order to a taker order (such as by adjusting its limit price such that it crosses the bid-ask spread). If so, then the message is treated the same way as in the first case—it is bundled with all the contra orders, and they are marked 'uncertain' and sent off to the credit engine at 306.

If the message does not convert a passive order to a taker order, then the message is processed as it would be by an otherwise unmodified matching engine—independently of the credit engine and according to the ETV's rules that are also implemented in the matching engine at 314.

Figure 4:
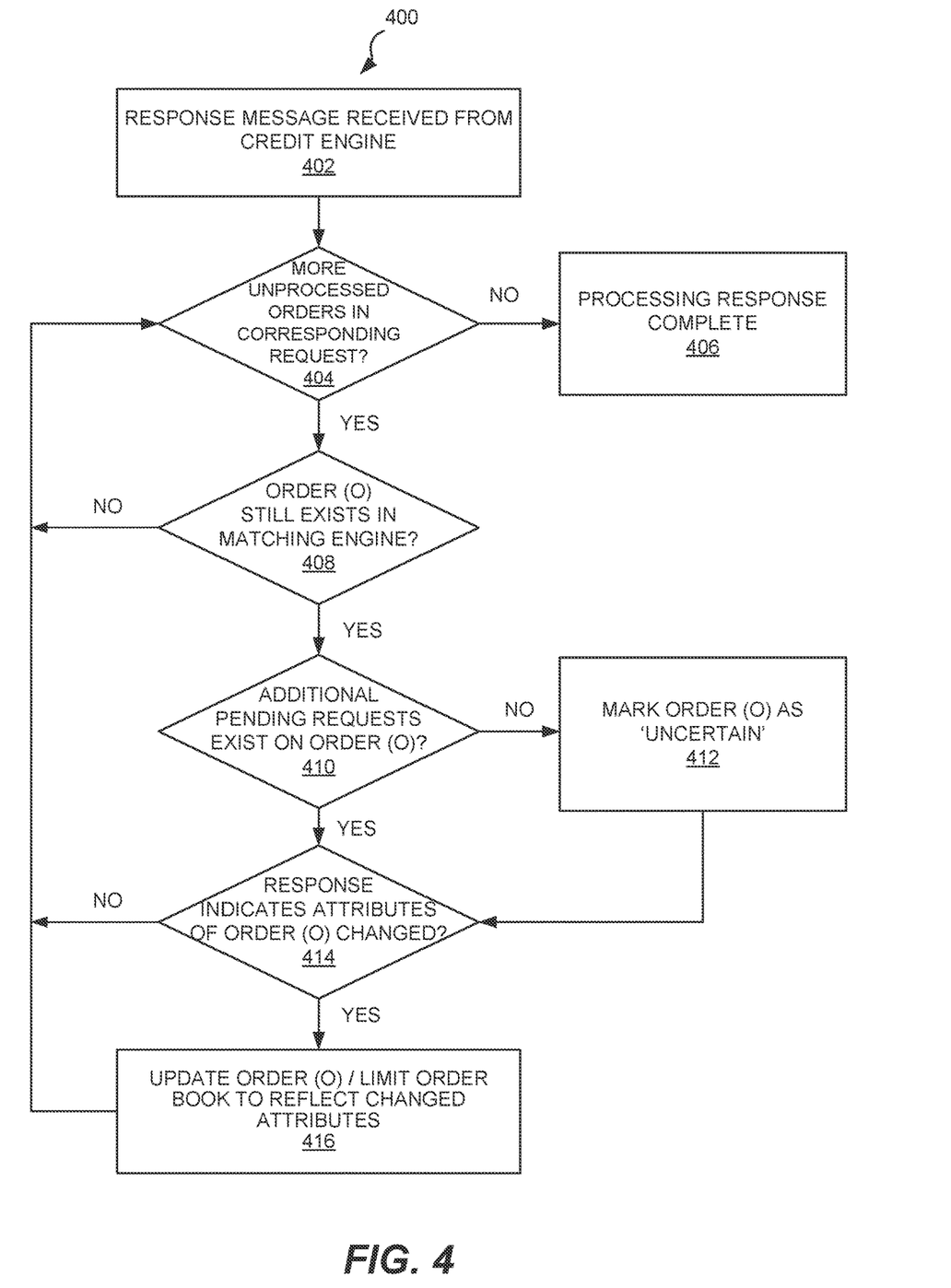
FIG. 4 illustrates an example of a method for processing by the matching engine a result of a credit engine of the electronic trading venue.

FIG. 4 illustrates an example of a method 400 for processing by the matching engine 220 a result of a credit engine 230 of the electronic trading venue. At 402, the method 400 may include receiving a response message from the credit engine 230. At 404, the method 400 may include iterating through orders to determine whether any orders O exists in the matching engine 220. For example, each order O that was sent in the corresponding request to which the response pertains is processed one-by-one until no such unprocessed orders remain, at which time the matching engine's processing of the credit engine's response is complete. If the order O no longer exists in the matching engine 220 because it was previously closed, canceled or completely filled then processing then processing of O is complete at 406. If, however, order O does exist and there are no additional pending requests (410) on it subsequent to the one to which the current response pertains then it is marked by the matching engine as 'certain' (i.e., unmarked as 'uncertain') at 412. At 414, if the response indicates that no attributes of the order O have changed (and there are no additional pending requests), the processing of O is complete at 406. If, however, the response indicates that attributes of order O have changed the matching engine may conclude processing of O by applying the changes indicated in the response message to O and its instrument's limit order book 222 at 416. Examples of such attribute changes may include a change in visible quantity of an iceberg order, a change in the cumulative or open quantity of an order, a change in the temporal position of the order in the instrument's limit order book due to a replacement on O to a new price-level or increase in original quantity, cancelation/removal of O from market, and so on.

Figure 5:
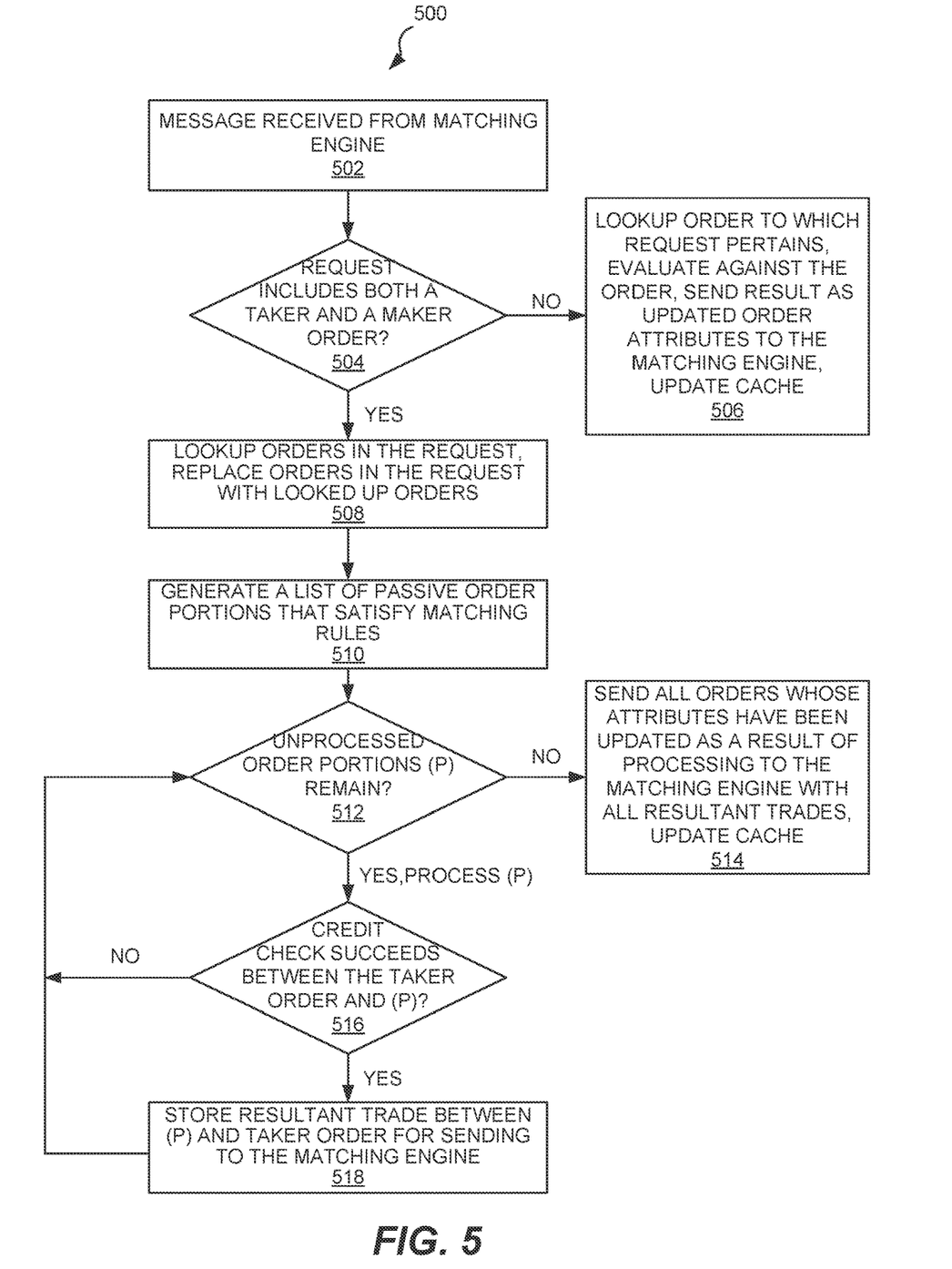
FIG. 5 illustrates an example of a method for processing by the credit engine a non-blocking message from the matching engine.

FIG. 5 illustrates an example of a method 500 for processing by the credit engine 230 a non-blocking message from the matching engine 220.

At 502, the method 500 may include receiving (by the credit engine 230) a request message from the matching engine 220. At 504, the credit engine 230 may determine whether the request message includes one or more taker orders and one or more maker orders. If it does not, then it likely contains a cancel or cancel-replace request and it is processed at 506 by looking up the credit engine's cache of orders at cache 233 to find orders to which the request pertains, processing the request against that order and sending the result as a response back to the matching engine 220. Non-limiting examples of results could be a 'cancel-reject' because the looked-up order has already been completed filled, or modified order attributes if a cancel-replace succeeds in replacing an existing order to a new size or price level. The cache 233 is updated to refer to this new version of the affected order.

Returning to 504, if the request message includes a taker order and corresponding price-compatible contra orders, then the most recent versions of those orders are looked-up in the cache 233 at 508, and where they are found replace any older version of the same order in the request. This ensures the credit engine 230 will operate on the most up-to-date versions of each order in the request message, and not on an older version, which may include a lagging filled quantity. At 510, the credit engine 230 may generate a list of passive order 'portions' the ordering of which is consistent with the matching rules for the ETV. Portions of orders and not, say, individual orders are likely to be necessary in the production of such a list because on most ETVs the hidden quantity of an iceberg order has lower priority than its visible tip and indeed any other visible quantity from regular limit orders at the price-level in the book. In this scenario the iceberg would be split into a portion associated with its tip that would appear nearer the front of the list, and one or more portions associated with its hidden quantity that would be nearer the back of the list.

Having created a priority list of passive order portions the items in that list are processed one-by-one until either no such portions remain (512) or the taker order against which they are subject to matching is completely filled. If the credit check between the taker order and passive order portion succeeds (516), a match record is generated and stored to be sent later at 518. If the credit check fails (516) then that passive order portion is skipped and any next unprocessed portion is checked at 512. Credit checking in non-blocking messaging is unmodified compared to credit checking in blocking messaging systems insofar as both involve ascertaining from the taker order and passive order portion the two counterparties, finding the credit lines between them, and in the event of success drawing down those lines by the size of the trade on the order portion. When processing of all maker orders is complete or the taker order is completely filled, then at 514 the trades and updated order attributes are sent in the response to the matching engine. All trades on distinct portions from the same order may be 'summed' into a single such trade before sending. The credit engine 230 updates its cache 233 with the latest versions of all such orders.

Figure 6:
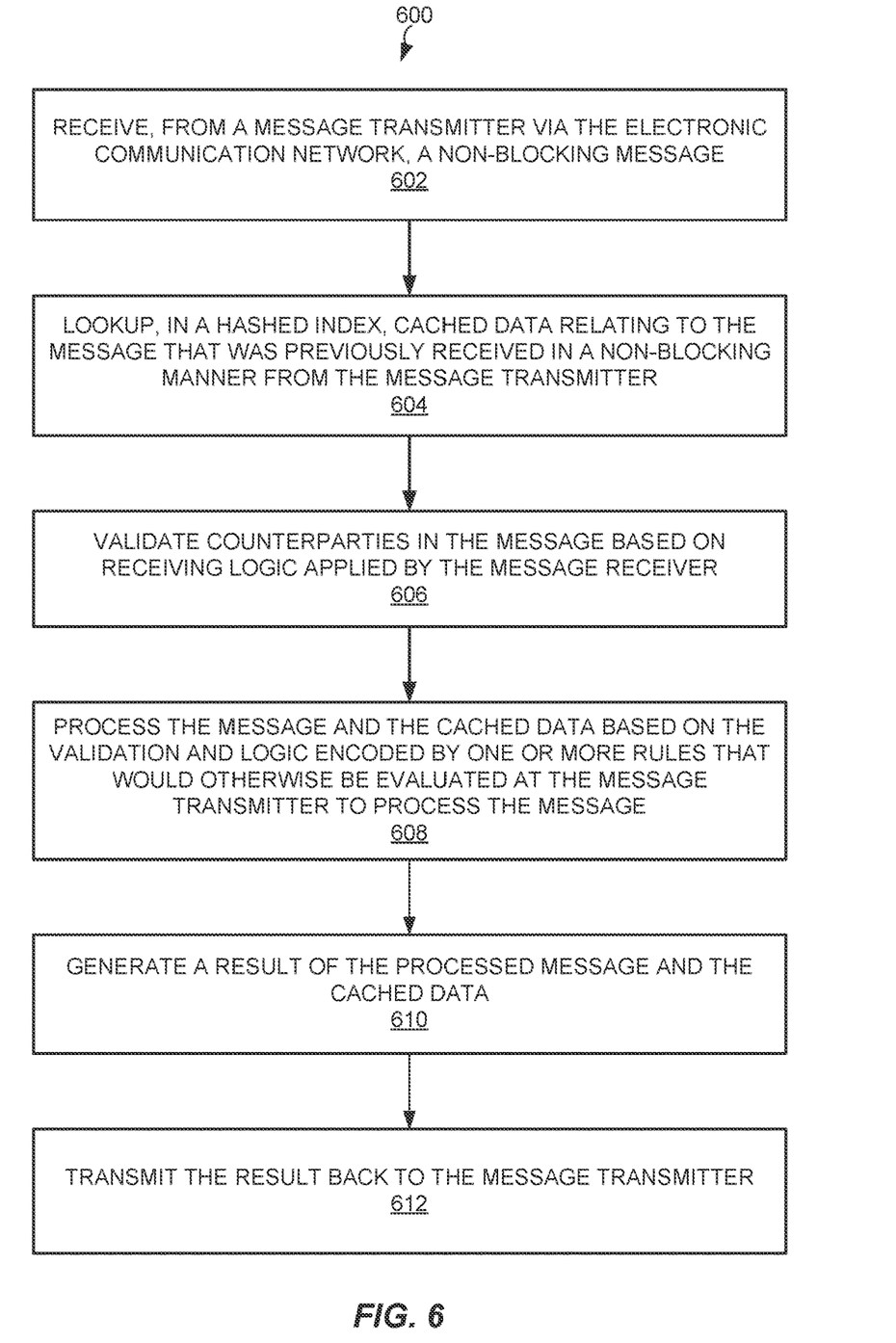
FIG. 6 illustrates an example of a method of non-blocking messaging to reduce congestion and execution time in an electronic communication network.

FIG. 6 illustrates an example of a method 600 of non-blocking messaging to reduce congestion and execution time in an electronic communication network. At 602, the method 600 may include receiving, from a message transmitter (such as the message transmitter 120 illustrated in FIG. 1B) via the electronic communication network, a non-blocking message.

At 604, the method 600 may include looking up, in a hashed index, cached data relating to the message that was previously received in a non-blocking manner from the message transmitter. The cached data may be a hashmap cache, such as the cache 233 illustrated in FIG. 1B.

At 606, the method 600 may include validating counterparties in the message based on receiver logic (such Rx logic 131 illustrated in FIG. 1B) as applied by the message receiver.

At 608, the method 600 may include processing the message and the cached data based on the validation and logic encoded by one or more rules (such as the Tx logic 121 illustrated in FIG. 1B) that would otherwise be evaluated at the message transmitter to process the message.

At 610, the method 600 may include generating a result of the processed message and the cached data.

At 612, the method 600 may include transmitting the result back to the message transmitter.

Figure 7:
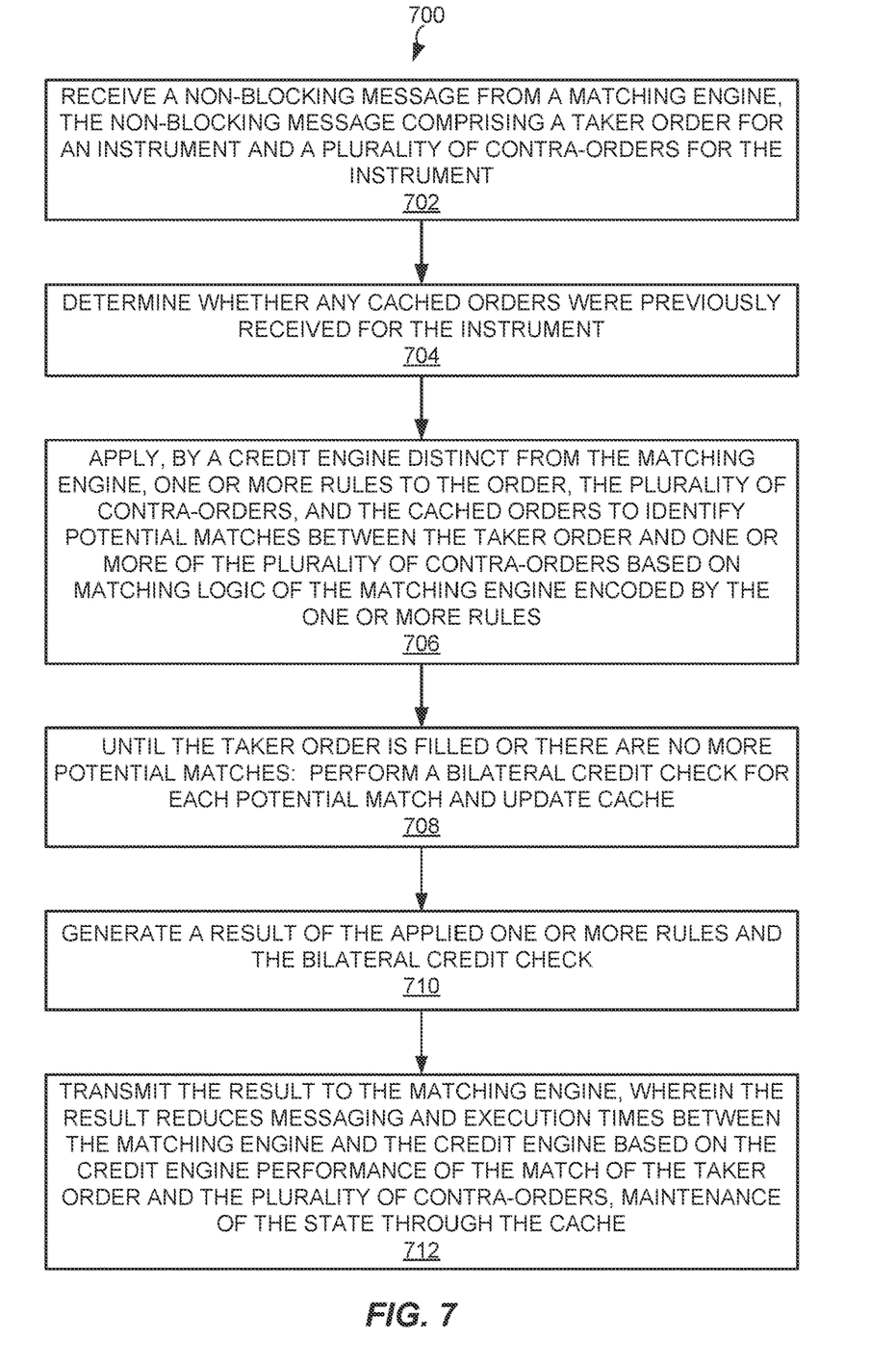
FIG. 7 illustrates an example of a method of an electronic trading venue that implements non-blocking messaging to reduce congestion and execution time in an electronic communication network.

FIG. 7 illustrates an example of a method 700 of an electronic trading venue that implements non-blocking messaging to reduce congestion and execution time in an electronic communication network.

At 702, the method 700 may include receiving a non-blocking message from a matching engine 220, the non-blocking message comprising a taker order for an instrument and a plurality of contra-orders for the instrument.

At 704, the method 700 may include determining whether any cached orders were previously received for the instrument.

At 706, the method 700 may include applying, by a credit engine 230 distinct from the matching engine, one or more rules to the order, the plurality of contra-orders, and the cached orders to identify potential matches between the taker order and one or more of the plurality of contra-orders based on matching logic of the matching engine encoded by the one or more rules (such as match rules used by the ETV 210).

At 708, the method 700 may include, until the taker order is filled or there are no more potential matches: identifying the next potential match in the plurality of potential matches. For the next potential match: performing a bilateral credit check to determine whether a taker market participant that submitted the taker order and a market participant that submitted a contra-order of the potential match have sufficient bilateral credit to complete the potential match, and updating update the cache 233 that maintains a state of the taker order based on the determination.

At 710, the method 700 may include generating a result of the applied one or more rules and the bilateral credit check.

At 712, the method 700 may include transmitting the result to the matching engine, wherein the result reduces messaging and execution times between the matching engine and the credit engine based on the credit engine performance of the match of the taker order and the plurality of contra-orders, maintenance of the state through the cache 233.

Further Improvements to the ETV 210

The description of the invention in the previous section is intended to be largely pedagogical in nature. In this section various optimizations to the scheme are described that may improve its efficiency and/or efficacy.

Message size reduction with integer order identifiers. In some matching engine implementations each order message on an instrument is given a unique integer identifier. If key attributes of the order are not modifiable (e.g., limit price, original quantity) after assignment of this integer identifier, and if the matching engine keeps track of which orders it has previously sent to the credit engine then subsequent transmission of that order may advantageously involve sending only the integer identifier of the order and not its other attributes (such as its limit price, counterparty who submitted it, its side, etc.). On a per instrument basis the cache of orders at the credit engine may be indexable by the integer e.g., using a hash map.

Message size reduction with integer request identifiers and implicitness. To tie a request and its response together the matching engine may include a unique integer identifier in each new request message sent to the credit engine. The credit engine may include that unique identifier in its response to the matching engine. Rather than send back all the orders that appeared in the request, the absence of an order from a response message may implicitly indicate that there are no updates to any of the orders in the corresponding request at the matching engine. Advantageously this 'implicitness' approach may reduce message size. Further, when an order is modified it may be implicit that only the fields that have changed in the order and not the entirety of its fields are sent in the response. Finally, if updates to an order can be calculated exclusively from the trade record sent in the response it may be implicit that those updated fields on the involved orders are calculated at the matching engine entirely from the trade record.

Batching of taker orders. Disclosed in U.S. patent Ser. No. 10/325,317B2 entitled Ideal Latency Floor is a scheme for batching together competing taker orders. Since all such competing taker orders are drained from such a batch atomically, at substantially the same time, rather than send to the credit engine one request for each taker order, one-by-one, all taker orders may be sent in a single request along with the superset of contra passive orders they are each price-compatible with for 'splitting by taker order' at the credit engine. This may serve to reduce messaging between the matching engine and credit engine.

Matching engine cache indicating existence of a credit relationship. Each matching engine instance may be provided with a local cache of credit relationships (e.g., at the start of the trading session, by the credit administration system, as a file). These relationships may be collapsed from having a magnitude and type (e.g. net or gross limit) as they likely would in the credit engine and credit administration system, to a simple 'yes' or 'no', that such a credit line (bilaterally) exists. To the extent this list is mostly static (e.g., credit between two counterparties is exhausted for the day/instrument/tenor, or a credit relationship simply does not exist between the counterparties) the matching engine can incorporate checking of this list into what would otherwise be the price-compatibility check described throughout this document. So, for instance, if a taker order was received from counterparty A that was only price compatible with a single passive order from counterparty B, and the matching engine interrogated its local cache of credit to determine that no credit relationship exists between A and B, then there is no need for the matching engine to forward those two orders as a request to the credit engine. This may reduce messaging traffic to the credit engine and improve response time in processing matches. It may also advantageously be used to exclude certain passive orders from being sent when there are a plurality of such passive orders against which the taker is price-compatible.

Pruning of cache at credit engine. The cache of orders at the credit engine need not grow indefinitely. After an order is closed because it has been completely filled or canceled the credit engine may remove it from the cache to improve memory efficiency and lookup time. If this scheme is used in conjunction with the 'send the entire order once only from the matching engine, then subsequently only send the order identifier' scheme mentioned above, it would be implicit that if an order id (only) were received for which there was no corresponding entry in the credit engine's hashmap cache, then the order may be determined to have been closed. In this way orders may be removed from the cache once they have been closed (i.e., filled or canceled).

Delayed insertion of taker orders into the order book. Orders with a persistent time-in-force (e.g., good-till-canceled) that cross the bid-ask spread may not be inserted into the limit order book at the matching engine until a response has been received from the credit engine or it has otherwise been determined they lack credit to trade on entry. Advantageously this approach may avoid flickering of a 'crossed market' while credit checking on such an order is pending. While these orders may experience a delay being inserted into the book so as not to appear in market data, it may nevertheless be beneficial to include them in the matching engine's private view of the prevailing bid and ask. In this way a good-till-canceled order that crosses the spread but does not (completely) fill on entry will not have time priority violated because despite being withheld from the book the matching engine will still send it to the credit engine as a passive order if a subsequent taker order is received with which it is price compatible, while its own initial request as taker is pending.

Figure 8:
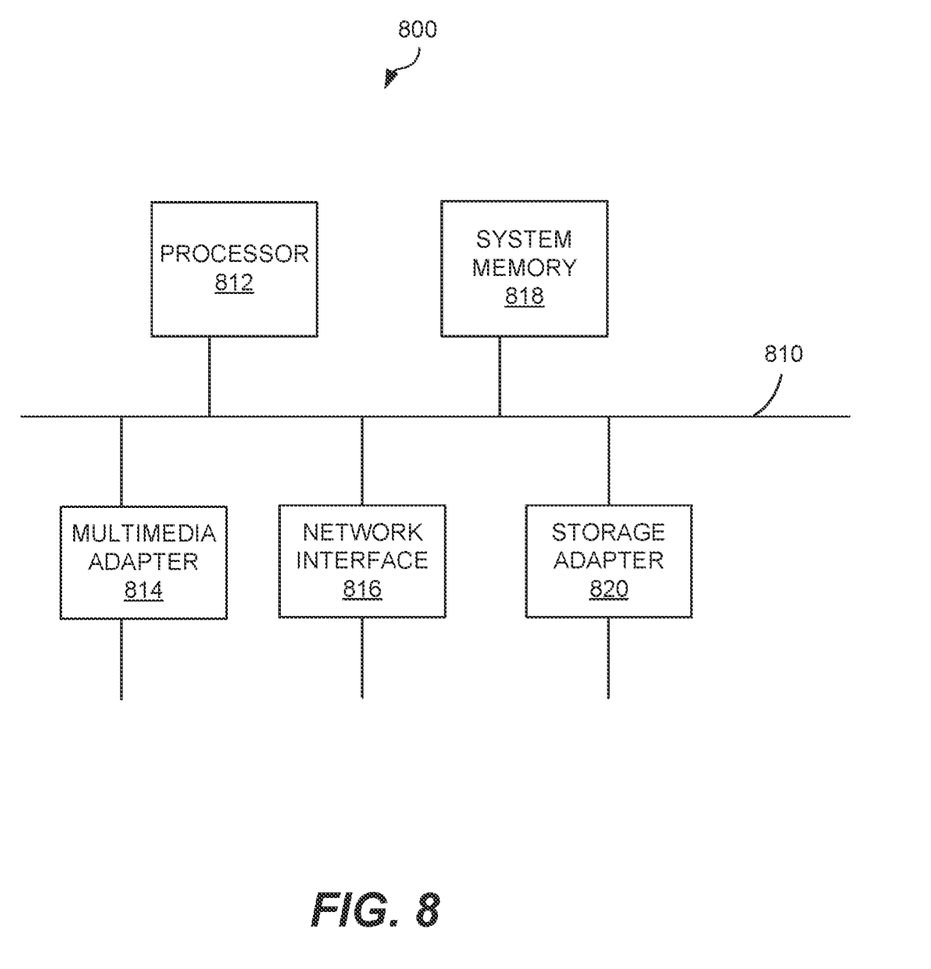
FIG. 8 illustrates an example of a computer system illustrated in FIG. 2.

FIG. 8 illustrates an example of a computer system 800 that may be implemented by the computer system illustrated in FIG. 2. The computer system 800 may include, among other things, an interconnect 810, a processor 812, a multimedia adapter 814, a network interface 816, a system memory 818, and a storage adapter 820.

The interconnect 810 may interconnect various subsystems, elements, and/or components of the computer system 800. As shown, the interconnect 810 may be an abstraction that may represent any one or more separate physical buses, point-to-point connections, or both, connected by appropriate bridges, adapters, or controllers. In some examples, the interconnect 810 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1364 bus, or "firewire," or other similar interconnection element.

In some examples, the interconnect 810 may allow data communication between the processor 812 and system memory 818, which may include read-only memory (ROM) or flash memory (neither shown), random-access memory (RAM), and/or other non-transitory computer readable media (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 812 may control operations of the computer system 800. In some examples, the processor 812 may do so by executing instructions such as software or firmware stored in system memory 818 or other data via the storage adapter 820. In some examples, the processor 812 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 814 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 816 may provide the computer system 800 with an ability to communicate with a variety of remote devices over a network. The network interface 816 may include, for example, an Ethernet adapter, a Fibre Channel adapter, and/or other wired- or wireless-enabled adapter. The network interface 816 may provide a direct or indirect connection from one network element to another, and facilitate communication and between various network elements.

The storage adapter 820 may connect to a standard computer readable medium for storage and/or retrieval of information, such as a fixed disk drive (internal or external).

Other devices, components, elements, or subsystems (not illustrated) may be connected in a similar manner to the interconnect 810 or via a network. The network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

The devices and subsystems can be interconnected in different ways from that shown in FIG. 8. Instructions to implement various examples and implementations described herein may be stored in computer-readable storage media such as one or more of system memory 818 or other storage. Instructions to implement the present disclosure may also be received via one or more interfaces and stored in memory. The operating system provided on computer system 800 may be MS-DOS®, MS-WINDOWS®, OS/2®, OS X®, IOS®, ANDROID®, UNIX®, Linux®, or another operating system.

In FIG. 1, as well as in other drawing Figures, different numbers of entities than those depicted may be used. Furthermore, according to various implementations, the components described herein may be implemented in hardware and/or software that configure hardware.

For simplicity and illustrative purposes, the disclosure included descriptions that may refer to examples. In the description, numerous specific details have been set forth in object to provide a thorough understanding of the present disclosure. It will be readily apparent however, that the disclosure may be practiced without limitation to these specific details. In other instances, some methods and structures have not been described in detail so as not to unnecessarily obscure the present disclosure. In some instances, various method operations may be omitted and the various method operations are not necessarily performed in the object in which they are presented.

Throughout the disclosure, the term "a" and "an" may be intended to denote at least one of a particular element. As used herein, the term "includes" means includes but not limited to, the term "including" means including but not limited to. The term "based on" means based at least in part on.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure. What has been described and illustrated herein is an example of the disclosure along with some of its variations. The terms, descriptions and figures used herein are set forth by way of illustration only and are not meant as limitations. As such, the disclosure is intended to be defined by the following claims—and their equivalents—in which all terms are meant in their broadest reasonable sense unless otherwise indicated.

What is claimed is:

1. A system of non-blocking messaging to reduce congestion and execution time in an electronic communication network, the system comprising a message receiver programmed to:
   receive, from a message transmitter via the electronic communication network, a non- blocking message;
   lookup, in a hashed index, cached data relating to the message that was previously received in a non-blocking manner from the message transmitter;
   validate counterparties in the message based on receiving logic applied by the message receiver;
   process the message and the cached data based on the validation and logic encoded by one or more rules that would otherwise be evaluated at the message transmitter to process the message;
   generate a result of the processed message and the cached data; and
   transmit the result back to the message transmitter.

2. A method of non-blocking messaging to reduce congestion and execution time in an electronic communication network, the method comprising:
   receiving, by a one or more processors, from a message transmitter via the electronic communication network, a non-blocking message;
   looking up, by the one or more processors, in a hashed index, cached data relating to the message that was previously received in a non-blocking manner from the message transmitter;
   validating, by the one or more processors, counterparties in the message based on receiving logic applied by the one or more processors;
   processing, by the one or more processors, the message and the cached data based on the validation and logic encoded by one or more rules that would otherwise be evaluated at the message transmitter to process the message;
   generating, by the one or more processors, a result of the processed message and the cached data; and
   transmitting, by the one or more processors, the result back to the message transmitter.

* * * * *